United States Patent
Jeyapaul et al.

(10) Patent No.: US 11,162,852 B1
(45) Date of Patent: Nov. 2, 2021

(54) FIBER BRAGG GRATING-BASED PRESSURE SENSOR FOR A PRESSURE BOTTLE

(71) Applicant: Kidde Technologies, Inc., Wilson, NC (US)

(72) Inventors: Elbert Jeyapaul, Karnataka (IN); Aswin Kumar Vallamkondu, Karnataka (IN)

(73) Assignee: KIDDE TECHNOLOGIES, INC., Wilson, NC (US)

( * ) Notice: Subject to any disclaimer, the term of this patent is extended or adjusted under 35 U.S.C. 154(b) by 0 days.

(21) Appl. No.: 17/014,493

(22) Filed: Sep. 8, 2020

(30) Foreign Application Priority Data

Jul. 10, 2020 (IN) .............................. 202011029437

(51) Int. Cl.
| | |
|---|---|
| *G01L 1/24* | (2006.01) |
| *G01L 11/02* | (2006.01) |
| *G02B 6/02* | (2006.01) |
| *G01K 11/3206* | (2021.01) |

(52) U.S. Cl.
CPC ............ *G01L 1/246* (2013.01); *G01L 11/025* (2013.01); *G01K 11/3206* (2013.01); *G02B 6/02076* (2013.01)

(58) Field of Classification Search
None
See application file for complete search history.

(56) References Cited

U.S. PATENT DOCUMENTS

| | | | |
|---|---|---|---|
| 5,863,752 A * | 1/1999 | Court ...................... | C12Q 1/06 435/34 |
| 6,278,811 B1 | 8/2001 | Hay et al. | |
| 7,047,816 B2 | 5/2006 | Jones et al. | |
| 7,197,934 B2 | 4/2007 | Wittrisch et al. | |
| 8,402,834 B1 * | 3/2013 | Moslehi ................ | G01L 9/0076 73/705 |
| 8,805,128 B2 | 8/2014 | Wild et al. | |
| 10,101,226 B2 | 10/2018 | Schemmann | |
| 2007/0068262 A1 * | 3/2007 | Skinner ................. | E21B 47/135 73/705 |
| 2008/0317401 A1 * | 12/2008 | Huang ................... | G01L 11/025 385/13 |

FOREIGN PATENT DOCUMENTS

EP  1008840 A1  6/2000

OTHER PUBLICATIONS

Huang et al., "A diaphragm-type fiber Bragg grating pressure sensor with temperature compensation", Measurement 46, 2013, pp. 1041-1046.
Liang et al., "Temperature Compensation Fiber Bragg Grating Pressure Sensor Based on Plane Diaphragm", Photonic Sensors, vol. 8, No. 2, 2018, pp. 157-167.

* cited by examiner

*Primary Examiner* — Chad H Smith
(74) *Attorney, Agent, or Firm* — Cantor Colburn LLP

(57) ABSTRACT

A sensor to sense pressure in a pressure bottle and a method of assembling the sensor involve two or more fiber Bragg gratings (FBGs) affixed to a different radial location of a diaphragm seal of the pressure bottle. The sensor includes a light source to provide incident light to the two or more FBGs, and a photodetector to detect reflected light resulting from the two or more FBGs. Processing circuitry determines a pressure change in the pressure bottle based on the reflected light resulting from each of the two or more FBGs.

20 Claims, 5 Drawing Sheets

FIBER BRAGG GRATING-BASED PRESSURE SENSOR FOR A PRESSURE BOTTLE

CROSS-REFERENCE TO RELATED APPLICATIONS

This application claims the benefit of IN Provisional Application No. 202011029437 filed Jul. 10, 2020, the disclosure of which is incorporated herein by reference in its entirety.

BACKGROUND

Exemplary embodiments pertain to the art of fire suppression and, more particularly, to a fiber Bragg grating-based pressure sensor for a pressure bottle.

A pressure bottle stores substances at high pressures. In an aircraft fire protection system, for example, a pressure bottle stores fire suppressants such as liquified halon and nitrogen gas at pressures that are about 3000 to 5000 pounds per square inch (PSI). Monitoring the pressure of the pressure bottle is performed to obtain information such as whether discharge or leakage of the contents of the pressure bottle has occurred.

BRIEF DESCRIPTION

In one embodiment, a sensor to sense pressure in a pressure bottle includes two or more fiber Bragg gratings (FBGs) affixed to a different radial location of a diaphragm seal of the pressure bottle, and a light source to provide incident light to the two or more FBGs. A photodetector detects reflected light resulting from the two or more FBGs, and processing circuitry determines a pressure change in the pressure bottle based on the reflected light resulting from each of the two or more FBGs.

Additionally or alternatively, in this or other embodiments, the two or more FBGs include a same periodic variation in refractive index.

Additionally or alternatively, in this or other embodiments, one of the two or more FBGs is affixed to a center of the diaphragm seal.

Additionally or alternatively, in this or other embodiments, another of the two or more FBGs is affixed at a radial distance r from the center of the diaphragm seal that has a radius R, and the radial distance r is less than $$\frac{R}{\sqrt{3}}.$$

Additionally or alternatively, in this or other embodiments, the two or more FBGs are in different locations of one optical fiber.

Additionally or alternatively, in this or other embodiments, the two or more FBGs are in two or more optical fibers.

Additionally or alternatively, in this or other embodiments, the light source is a laser to output white light as the incident light to one or more optical fibers that include the two or more FBGs.

Additionally or alternatively, in this or other embodiments, the processing circuitry determines a baseline wavelength for each of the two or more FBGs based on the reflected light resulting from each of the two or more FBGs without any strain on the diaphragm seal.

Additionally or alternatively, in this or other embodiments, the baseline wavelength for each of the two or more FBGs is a same wavelength.

Additionally or alternatively, in this or other embodiments, the processing circuitry determines a shift from the baseline wavelength for each of the two or more FBGs based on the reflected light resulting from each of the two or more FBGs when the diaphragm seal is under strain, and determines a pressure change in the pressure bottle based on a difference in the shift for each of the two or more FBGs.

In another embodiment, a method of assembling a pressure sensor to sense pressure in a pressure bottle includes affixing two or more fiber Bragg gratings (FBGs) at a different radial location of a diaphragm seal of the pressure bottle, and arranging a light source to provide incident light to the two or more FBGs. A photodetector is arranged to detect reflected light resulting from the two or more FBGs, and processing circuitry is configured to determine a pressure change in the pressure bottle based on the reflected light resulting from each of the two or more FBGs.

Additionally or alternatively, in this or other embodiments, the affixing the two or more FBGs includes adhesive bonding the two or more FBGs.

Additionally or alternatively, in this or other embodiments, the affixing the two or more FBGs includes affixing two or more FBGs with a same periodic variation in refractive index.

Additionally or alternatively, in this or other embodiments, the affixing the two or more FBGs includes affixing one of the two or more FBGs to a center of the diaphragm seal.

Additionally or alternatively, in this or other embodiments, the affixing the two or more FBGs includes affixing another of the two or more FBGs at a radial distance r from the center of the diaphragm seal that has a radius R, the radial distance r being less than $$\frac{R}{\sqrt{3}}.$$

Additionally or alternatively, in this or other embodiments, the affixing the two or more FBGs includes affixing one optical fiber with the two or more FBGs at different locations of the one optical fiber.

Additionally or alternatively, in this or other embodiments, the affixing the two or more FBGs includes affixing two or more optical fibers with each of the two or more FBGs in each of the two or more optical fibers.

Additionally or alternatively, in this or other embodiments, the method also includes configuring the light source to output white light as the incident light to one or more optical fibers that include the two or more FBGs.

Additionally or alternatively, in this or other embodiments, the configuring the processing circuitry includes configuring the processing circuitry to determine a baseline wavelength for each of the two or more FBGs based on the reflected light resulting from each of the two or more FBGs without any strain on the diaphragm seal.

Additionally or alternatively, in this or other embodiments, the configuring the processing circuitry includes configuring the processing circuitry to determine a shift from the baseline wavelength for each of the two or more FBGs based on the reflected light resulting from each of the two or more FBGs when the diaphragm seal is under strain, and to determine a pressure change in the pressure bottle based on a difference in the shift for each of the two or more FBGs.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

As previously noted, the pressure of a pressure bottle is monitored. In an aircraft fire suppression application, for example, this monitoring ensures that proper pressure is maintained during storage and confirms discharge or indicates leakage. Embodiments of the systems and methods detailed herein relate to a fiber Bragg grating-based pressure sensor for a pressure bottle. As detailed, two or more fiber Bragg gratings (FBGs) may be attached to different areas of the diaphragm at the opening of the pressure bottle. The FBGs may be positioned to measure strain distribution on the diaphragm. Prior pressure sensors involve a piezo-resistive strain gauge coupled with a temperature sensor to result in a temperature-compensated pressure transducer (TCPT) with a compensated temperature range of −20 degrees Celsius to 85 degrees Celsius. The strain gauge is adhered to a diaphragm seal covering an opening of the pressure bottle. The pressure in the pressure bottle pushes the diaphragm against the opening such that a measurement of the strain on the diaphragm indicates the pressure in the pressure bottle. Because this strain measurement is affected by temperature, the separate temperature sensor is needed.

On the other hand, the FBG-based pressure sensor has built-in temperature compensation such that it does not require an additional temperature sensor. The temperature effect on each of the FBGs is the same. Thus, determining pressure by combining a strain measurement of each of the FBGs arranged on the diaphragm makes the pressure determination temperature-independent. As such, an external temperature measurement is not required. Additionally, the FBG-based pressure sensor for a pressure bottle, according to one or more embodiments, is immune to electromagnetic interference, moisture ingress and gasses, lightning, and fatigue.

Figure 1:
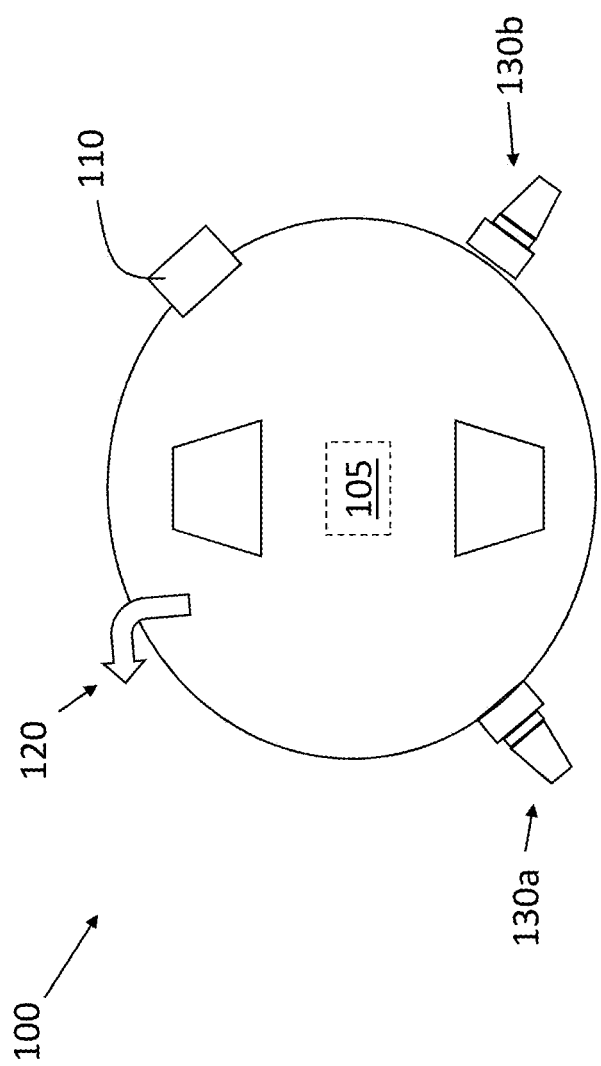
FIG. 1 shows an exemplary pressure bottle with a fiber Bragg grating-based pressure sensor according to one or more embodiments.

FIG. 1 shows an exemplary pressure bottle 100 with an FBG-based pressure sensor 110 according to one or more embodiments. The fire suppression system of an aircraft may include two or more pressure bottles 100 that discharge successively in high-rate discharge and low-rate discharge phases. The pressure bottles 100 may be interconnected according to exemplary arrangements. Those known configurations and arrangements are not detailed herein. Generally, each pressure bottle 100 includes a relief valve 120 and one more discharge assemblies 130a, 130b (generally referred to as 130). Each discharge assembly 130 may include an explosive cartridge or squib that is triggered (e.g., by a fire detection system) to initiate discharge of material in the interior volume 105 via a discharge port of the discharge assembly 130. The pressure sensor 110 is further detailed with reference to FIG. 2. As discussed with reference to FIG. 3, a circular diaphragm 310 at an opening in the pressure bottle 100 represents an interface between the interior volume 105 and the pressure sensor 110.

Figure 2:
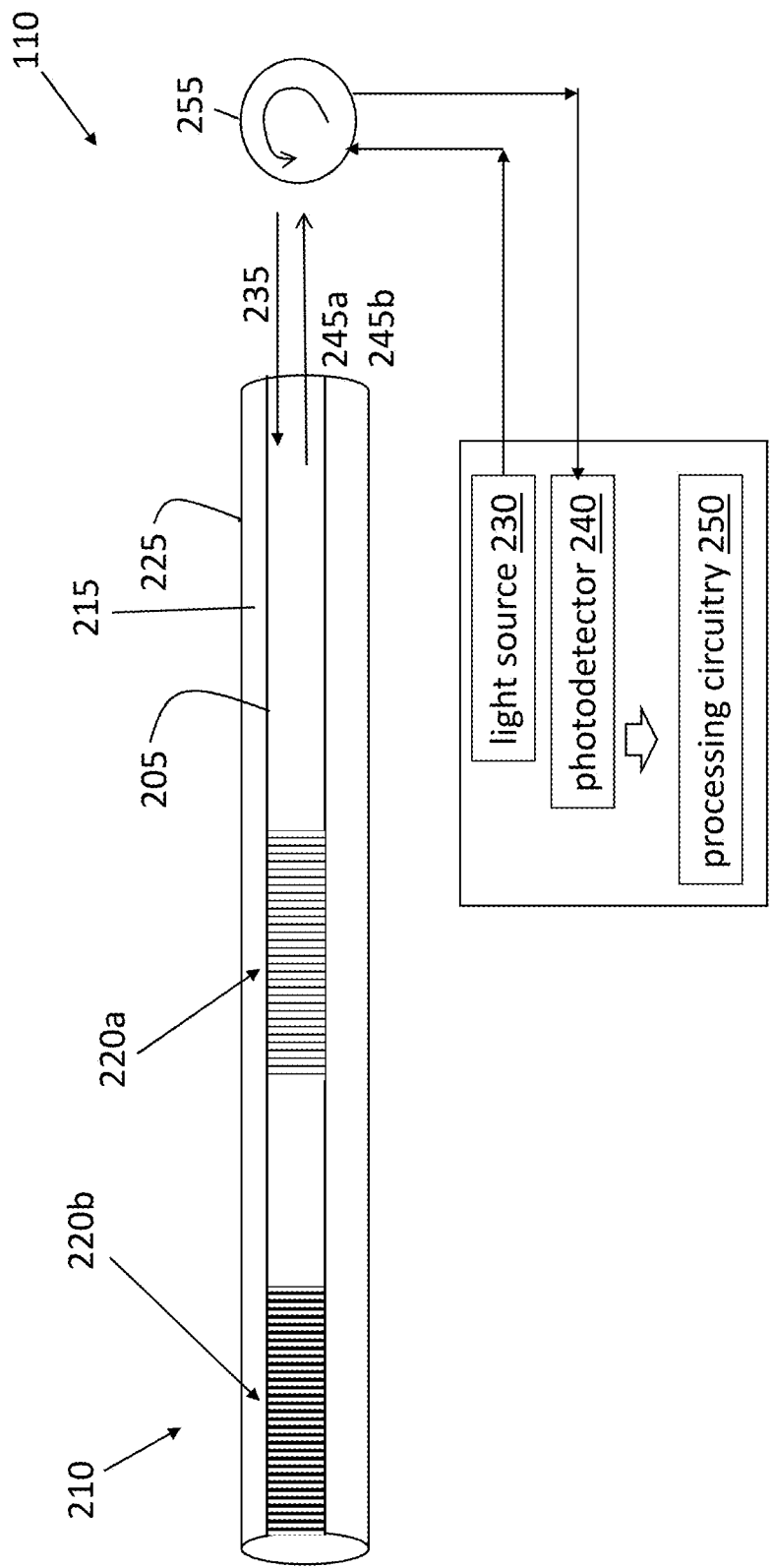
FIG. 2 is a block diagram of aspects of a pressure sensor according to an exemplary embodiment.

FIG. 2 is a block diagram of aspects of an FBG-based pressure sensor 110 according to an exemplary embodiment. An optical fiber 210 is shown. A light source 230 transmits incident light 235 into the optical fiber 210. The light source 230 may be a continuous or pulsed laser that transmits white light (i.e., light including many wavelengths), for example. The incident light 235 is reflected back as reflected light 245, which is shown as having components of reflected light 245a and 245b. A circulator 255 may be used to direct incident light 235 from the light source 230 into the optical fiber 210 and to direct reflected light 245 from the optical fiber 210 into the photodetector 240. The photodetector 240 detects characteristics (i.e., intensity and wavelength) of this reflected light 245. Processing circuitry 250 processes the detections of the photodetector 240 to determine temperature-compensated pressure in the pressurized bottle 100, as discussed with reference to FIG. 5. The processing circuitry 250 may include memory and one or more processors.

The optical fiber 210 includes a core 205 made of glass, for example. The optical fiber 210 also includes a protective outer coating 225 with a cladding 215 concentrically between the core 205 and the outer coating 225. The refractive index of the cladding 215 is lower than the refractive index of the core 205. This causes internal refraction of incident light 235 at the border of the core 205 and cladding 215 and prevents loss of incident light 235 at the sides of the optical fiber 210. Instead, incident light 235 transmitted into the optical fiber 210 is returned as reflected light 245.

Two FBGs 220a, 220b (referred to generally as 220) are shown along the optical fiber 210. Each FBG 220 is an area of the core 205 in which the refractive index has been altered. In the exemplary case shown in FIG. 2, the same periodic variation in the refractive index is written into the core 205 as each FBG 220. When incident light 235 with a range of wavelengths encounters an FBG 220, only a specific wavelength is reflected. This specific wavelength is referred to as the Bragg wavelength for the FBG 220 and is dictated by the refractive index variation of the FBG 220. All other wavelengths are transmitted.

In the exemplary case of FBG 220a and FBG 220b being the same, the wavelength reflected by each FBG 220 (i.e., the Bragg wavelength) is the same. That is, the first FBG 220a that is encountered by the incident light 235 reflects the Bragg wavelength in reflected light 245a and transmits the rest through to the second FBG 220b. Any light at the Bragg wavelength remaining in the transmitted incident light 235 is reflected by the second FBG 220b as reflected light 245b. The processing circuitry 250 can distinguish the reflected light 245a, 245b associated with each FBG 220a, 220b based on timing. That is, reflected light 245a resulting from FBG 220a will be received at the photodetector 240 before reflected light 245b resulting from FBG 220b, because the FBG 220a will be encountered first. When the Bragg wavelength in the reflected light 245a and the reflected light 245b is the same because the FBGs 220a and 220b are the same, the difference in the wavelength of the reflected light 245a and 245b is 0.

Figure 3:
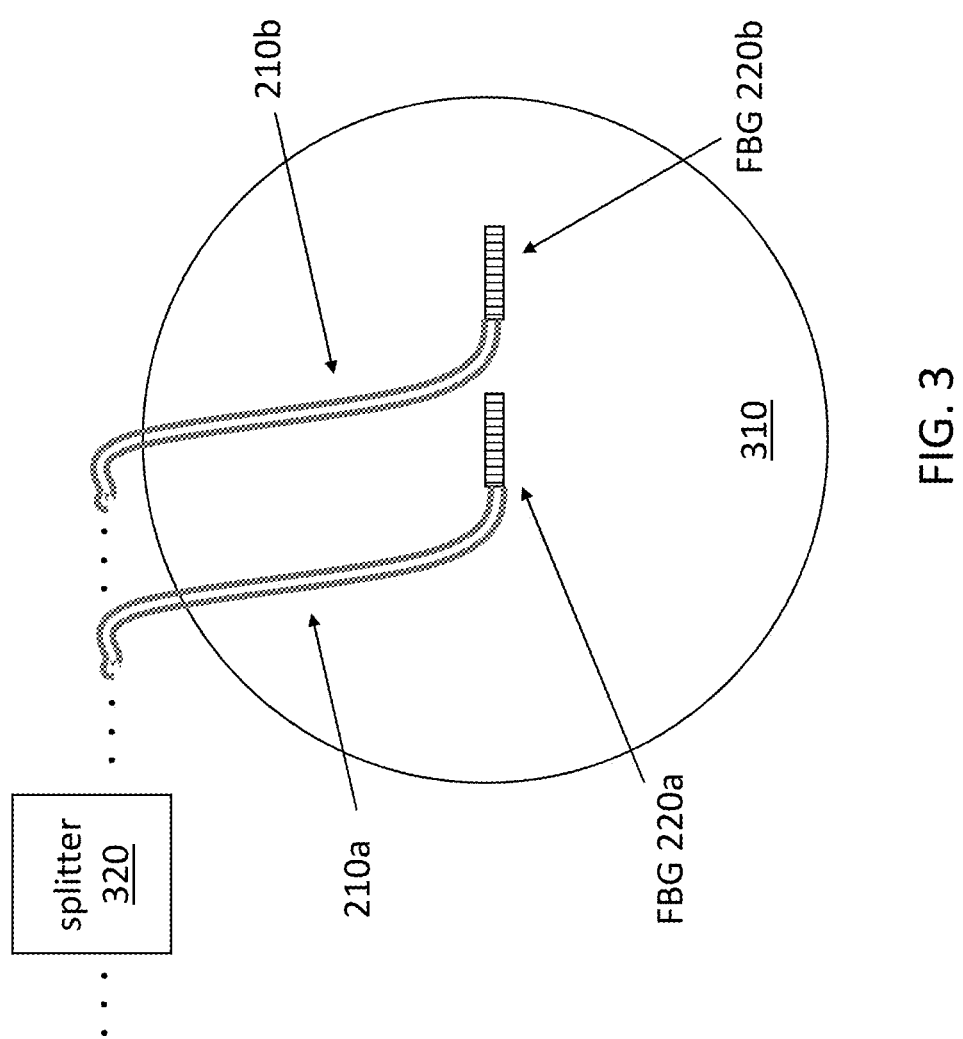
FIG. 3 shows a diaphragm used by the pressure sensor according to one or more embodiments.

While the FBGs 220a, 220b are shown as being part of the same optical fiber 210, they may be part of two different optical fibers 210, as shown in FIG. 3. In that case, a splitter 320 may be used at the output of the light source 230 to input incident light 235 into both optical fibers 210. In addition, a multiplexer may be used to input reflected light 245 from both optical fibers 210 into the circulator 255 to be provided to the photodetector 240. Further, while two FBGs 220 are discussed for explanatory purposes, any number of FBGs 220 may be used.

When the FBGs 220 remain unchanged, the Bragg wavelength that is reflected by each also remains unchanged. However, if the optical fiber 210 is stretched or compressed (i.e., strained) at an area corresponding with one or both of the FBGs 220, the refractive index variation of the corresponding FBG 220 is changed, and, consequently, the corresponding reflected Bragg wavelength is changed (i.e., shifted). The shift in the Bragg wavelength of one or both of the reflected signals 245a, 245b indicates strain. Thus, by attaching the FBGs 220 to a diaphragm 310 within the pressure bottle 100, this strain detection for the diaphragm 310 is used to sense the pressure in the pressure bottle 100, as detailed with reference to FIG. 5.

FIG. 3 shows a diaphragm 310 used by the FBG-based pressure sensor 110 according to one or more embodiments. As noted with reference to FIG. 1, the diaphragm 310 is at an opening in the pressure bottle 100. When the pressure bottle 100 is filled with pressurized material, the pressure in the interior volume 105 of the pressure bottle 100 pushes the diaphragm 310 against the opening and maintains the seal on the pressure bottle 100. In FIG. 3, the diaphragm 310 is shown flat (i.e., no pressure pushing on the diaphragm 310) with two FBGs 220 affixed to two different radial locations on the diaphragm 310. Each FBG 220 is affixed to the diaphragm 310 by adhesive bonding, for example. In the exemplary case shown in FIG. 3, the FBGs 220 are associated with different optical fibers 210 such that one FBG 220a is part of one optical fiber 210a, and the other FBG 220b is part of another optical fiber 210b. The splitter 320 that would split the incident light 235 from the light source 230 is indicated, but the other components are not shown again in FIG. 3. The positioning of the FBGs 220 on the diaphragm 310 is further discussed with reference to FIG. 4, and the determination of pressure change in the pressure bottle 100 using the FBGs 220 is discussed with reference to FIG. 5.

Figure 4:
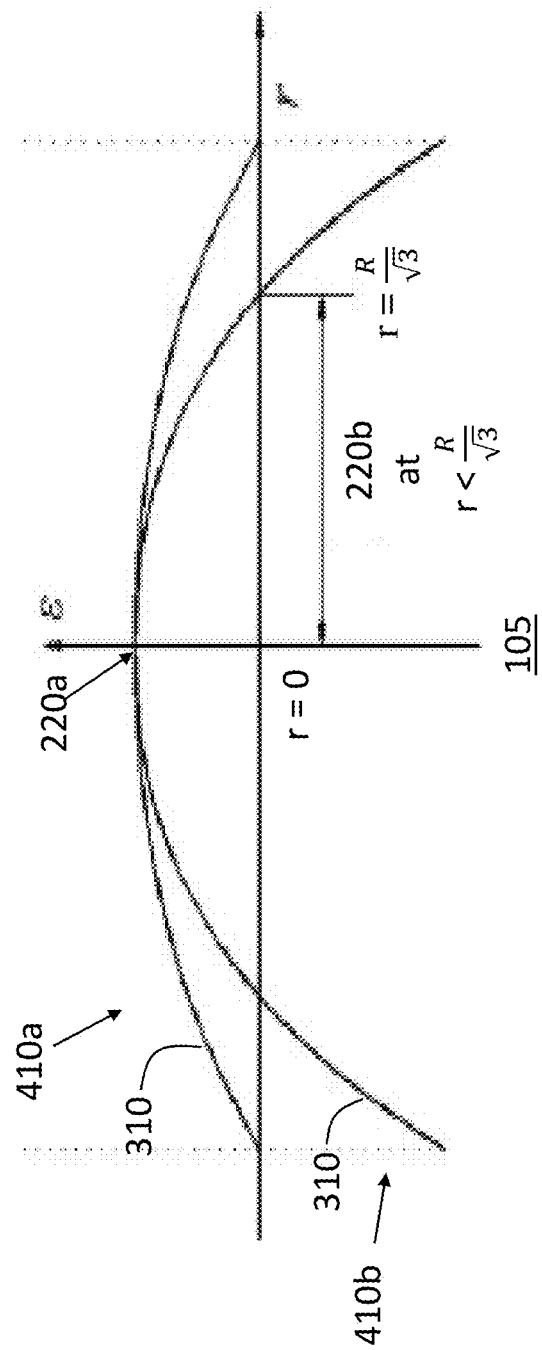
FIG. 4 illustrates strain distribution on the diaphragm under different levels of strain.

FIG. 4 illustrates strain distribution on the diaphragm 310 under different levels of strain a Curve 410a corresponds to tangential strain in the circular diaphragm 310, while curve 410b is the radial strain in the diaphragm 310. The FBGs 220a and 220b are both radially positioned, as indicated. Thus, the FBGs 220a, 220b only undergo radial straining. Radial straining is tensile and maximum at the center and reduces gradually as radius increases, becoming compressive beyond a particular radius. The diaphragm 310 undergoes tension up to a radial distance $$r = \frac{R}{\sqrt{3}},$$

where R is the radius of the diaphragm 310. By attaching the FBG 220a in the center (at r=0) and the FBG 220b at a radius $$r < \frac{R}{\sqrt{3}},$$

the sensitivity or me FBG-based pressure sensor is improved because both FBGs 220 will undergo tension but of different magnitudes.

Figure 5:
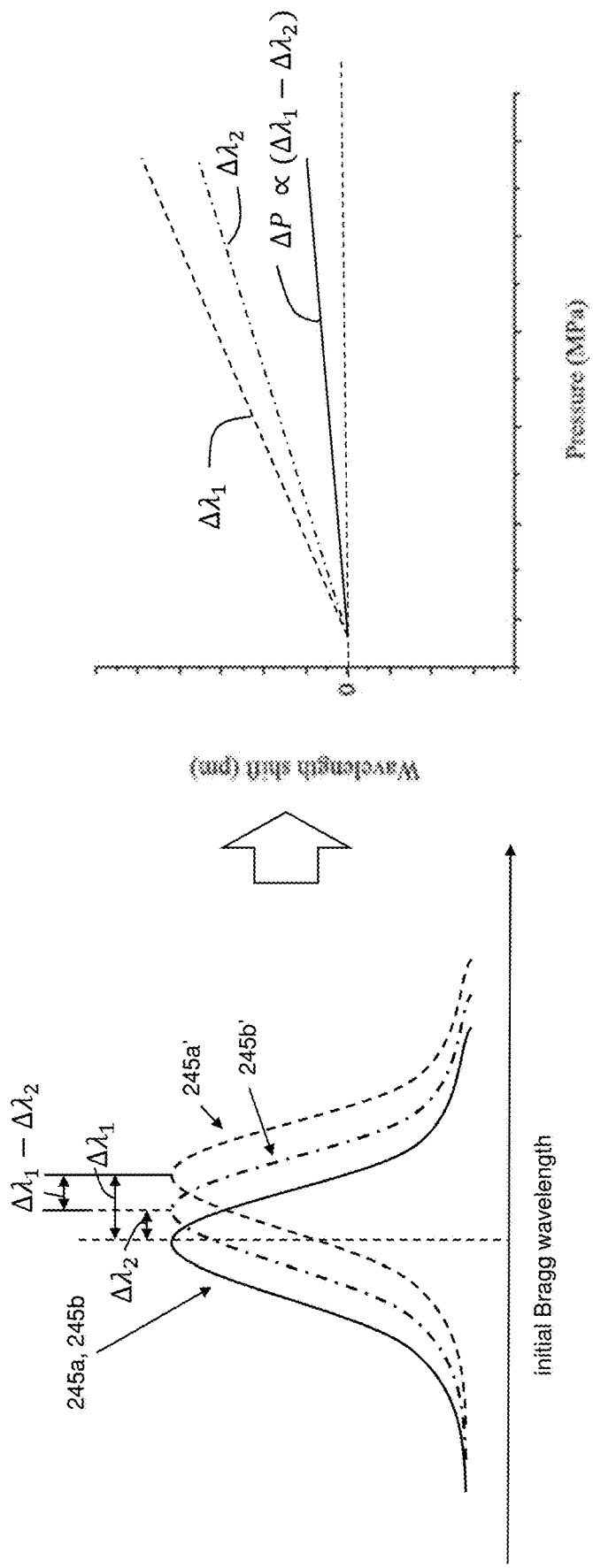
FIG. 5 illustrates exemplary reflected signals used by the pressure sensor according to one or more embodiments.

FIG. 5 illustrates exemplary reflected signals 245 used by the FBG-based pressure sensor 110 according to one or more embodiments. The initial reflected signals 245a, 245b that are received when the diaphragm 310 is flat are shown. As indicated and previously discussed, the reflected signals 245a, 245b are the same because the FBGs 220a, 220b are the same and, thus, their Bragg wavelengths are the same. When, for example, pressurized material is put in the interior volume 105 of the pressure bottle 100 and that pressure is exerted on the diaphragm 310, the diaphragm 310 will stretch. In this position of the diaphragm 310, reflected signals 245a' and 245b' are received.

Deformation of the diaphragm 310 will result in changes in the FBGs 220. The changes in the FBGs 220 will result in differences in the reflected signals 245a', 245b' received in the deformed state of the diaphragm 310 as compared to the reflected signals 245a, 245b received in the undeformed state of the diaphragm 310. The change in one FBG 220a, which is shown at the center of the diaphragm 310 in FIG. 3, is more extensive than the change in the other FBG 220b, which is shown radially off-center on the diaphragm 310 in FIG. 3. As a result, the shift $\Delta\lambda_1$ in the Bragg wavelength of the reflected signal 245a' as compared with reflected signal 245a (i.e., the reflected signal 245 corresponding with the FBG 220a) is higher than the shift $\Delta\lambda_2$ in the Bragg wavelength of the reflected signal 245b' as compared with reflected signal 245b (i.e., the reflected signal 245 corresponding with the FBG 220b), as shown.

On the right, pressure in mega Pascals (MPa) on the diaphragm 310 is shown along the x axis and wavelength shift in picometers (pm) is shown along the y axis. The shift $\Delta\lambda_1$ in the Bragg wavelength of the reflected signal 245a' as compared with reflected signal 245a is shown to increase as pressure increases. Similarly, the shift $\Delta\lambda_2$ in the Bragg wavelength of the reflected signal 245b' as compared with reflected signal 245b is shown to increase as pressure increases. The difference between these shifts (i.e., $\Delta\lambda_1 - \Delta\lambda_2$) indicates the change in pressure $\Delta P$ on the diaphragm 310, which indicates the change in pressure in the interior volume 105 of the pressure bottle 100. More specifically:

$$\Delta\lambda_1 - \Delta\lambda_2 = \frac{3\lambda(1-p_e)(1-\mu^2)\left[(\sqrt{2}-1)R^2 + 3r^2\right]}{8Eh^2}\Delta P \quad \text{[EQ. 1]}$$

The Bragg wavelength of the reflected signals 245a, 245b (i.e., in the undeformed state of the diaphragm 310) is $\lambda$, $p_e$ is the effective photo-elastic coefficient, $\mu$ is the Poisson's ratio of the material of the diaphragm 310, r is the radial distance to the FBG 220b, E is the Young's modules of the material of the diaphragm 310, and h is the thickness of the diaphragm 310.

As previously noted, temperature changes affect both FBGs 220a, 220b in the same way. Thus, because the strain on the diaphragm 310 that is sensed by the FBGs 220 is combined to sense a pressure change on the diaphragm 310, the temperature effect cancels out or, put another way, this FBG-based pressure sensing is temperature-independent. As discussed with reference to FIG. 4, positioning one FBG 220a at the center of the diaphragm 310 and another FBGs 220b at a radial distance of $$r < \frac{R}{\sqrt{3}}$$

on on the diaphragm 310 improves the sensitivity of the FBG-based pressure sensor 110. The differential wavelength (i.e., $\Delta\lambda_1 - \Delta\lambda_2$) may be less than about 1.5 pm per kilo Pascal of pressure difference, for example.

Once the pressure bottle 100 is filled with pressurized material (e.g., fire suppressants such as liquified halon and nitrogen gas), there will be a strain exerted on the diaphragm 310 such that the pressurized state of the pressure bottle 100 will result in a shift $\Delta\lambda_1$, $\Delta\lambda_2$ in the Bragg wavelength of each of the FBGs 220a, 220b. A decrease in pressure in the interior volume 105 of the pressure bottle 100 due to a leak or discharge will result in the shifts $\Delta\lambda_1$, $\Delta\lambda_2$ decreasing and approaching 0, as the diaphragm 310 approaches a flat, unstrained state.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A sensor to sense pressure in a pressure bottle comprising:
    two or more fiber Bragg gratings (FBGs), wherein each of the two or more FBGs is affixed to a different radial location of a diaphragm seal of the pressure bottle than a location of any other of the two or more FBGs;
    a light source configured to provide incident light to the two or more FBGs;
    a photodetector configured to detect reflected light resulting from the two or more FBGs; and
    processing circuitry configured to determine a pressure change in the pressure bottle based on the reflected light resulting from each of the two or more FBGs, wherein the two or more FBGs are affixed such that a wavelength of the reflected light resulting from all of the two or more FBGs is shifted in a same direction relative to a baseline wavelength in response to the pressure change.

2. The sensor according to claim 1, wherein the two or more FBGs include a same periodic variation in refractive index.

3. The sensor according to claim 1, wherein one of the two or more FBGs is affixed to a center of the diaphragm seal.

4. The sensor according to claim 3, wherein another of the two or more FBGs is affixed at a radial distance r from the center of the diaphragm seal that has a radius R, and the radial distance r is less than $$\frac{R}{\sqrt{3}}.$$

5. The sensor according to claim 1, wherein the two or more FBGs are in different locations of one optical fiber.

6. The sensor according to claim 1, wherein the two or more FBGs are in two or more optical fibers.

7. The sensor according to claim 1, wherein the light source is a laser configured to output white light as the incident light to one or more optical fibers that include the two or more FBGs.

8. The sensor according to claim 1, wherein the processing circuitry determines the baseline wavelength for each of the two or more FBGs based on the reflected light resulting from each of the two or more FBGs without any strain on the diaphragm seal.

9. The sensor according to claim 8, wherein the baseline wavelength for each of the two or more FBGs is a same wavelength.

10. The sensor according to claim 8, wherein the processing circuitry determines a shift from the baseline wavelength for each of the two or more FBGs based on the reflected light resulting from each of the two or more FBGs when the diaphragm seal is under strain, and determines a pressure change in the pressure bottle based on a difference in the shift for each of the two or more FBGs.

11. A method of assembling a pressure sensor to sense pressure in a pressure bottle, the method comprising:
    affixing two or more fiber Bragg gratings (FBGs), wherein the affixing includes affixing each of the two or more FBGs at a different radial location of a diaphragm seal of the pressure bottle than a location of any other of the two or more FBGs;
    arranging a light source to provide incident light to the two or more FBGs;
    arranging a photodetector to detect reflected light resulting from the two or more FBGs; and
    configuring processing circuitry to determine a pressure change in the pressure bottle based on the reflected light resulting from each of the two or more FBGs, wherein the two or more FBGs are affixed such that a wavelength of the reflected light resulting from all of the two or more FBGs is shifted in a same direction relative to a baseline wavelength in response to the pressure change.

12. The method according to claim 11, wherein the affixing the two or more FBGs includes adhesive bonding the two or more FBGs.

13. The method according to claim 11, wherein the affixing the two or more FBGs includes affixing two or more FBGs with a same periodic variation in refractive index.

14. The method according to claim 11, wherein the affixing the two or more FBGs includes affixing one of the two or more FBGs to a center of the diaphragm seal.

15. The method according to claim 14, wherein the affixing the two or more FBGs includes affixing another of the two or more FBGs at a radial distance r from the center of the diaphragm seal that has a radius R, the radial distance r being less than $$\frac{R}{\sqrt{3}}.$$

16. The method according to claim 11, wherein the affixing the two or more FBGs includes affixing one optical fiber with the two or more FBGs at different locations of the one optical fiber.

17. The method according to claim 11, wherein the affixing the two or more FBGs includes affixing two or more optical fibers with each of the two or more FBGs in each of the two or more optical fibers.

18. The method according to claim 11, further comprising configuring the light source to output white light as the incident light to one or more optical fibers that include the two or more FBGs.

19. The method according to claim 11, wherein the configuring the processing circuitry includes configuring the processing circuitry to determine the baseline wavelength for each of the two or more FBGs based on the reflected light resulting from each of the two or more FBGs without any strain on the diaphragm seal.

20. The method according to claim 19, wherein the configuring the processing circuitry includes configuring the processing circuitry to determine a shift from the baseline wavelength for each of the two or more FBGs based on the reflected light resulting from each of the two or more FBGs when the diaphragm seal is under strain, and to determine a pressure change in the pressure bottle based on a difference in the shift for each of the two or more FBGs.

* * * * *